(12) United States Patent
Priydarshi et al.

(10) Patent No.: US 11,119,112 B2
(45) Date of Patent: Sep. 14, 2021

(54) METHOD FOR COMPENSATING GYROSCOPE DRIFT ON AN ELECTRONIC DEVICE

(71) Applicant: Samsung Electronics Co., Ltd, Suwon-si (KR)

(72) Inventors: Priydarshi, Bangalore (IN); Prabhushetty Mulage, Bangalore (IN); Renju Chirakarotu Nair, Bangalore (IN); Ashok Kumar Senapati, Bangalore (IN); Naveen Krishna Yarlagadda, Bangalore (IN); Raju Suresh Dixit, Bangalore (IN); Raman Jaiswal, Bangalore (IN); Seongsig Kang, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 16/047,784

(22) Filed: Jul. 27, 2018

(65) Prior Publication Data

US 2019/0041417 A1    Feb. 7, 2019

(30) Foreign Application Priority Data

Aug. 2, 2017    (IN) .............................. 201641026376

(51) Int. Cl.
*G01P 1/00*    (2006.01)
*G01C 19/00*    (2013.01)
(Continued)

(52) U.S. Cl.
CPC .............. *G01P 1/006* (2013.01); *G01C 19/00* (2013.01); *G01C 25/005* (2013.01); *G01P 3/44* (2013.01);
(Continued)

(58) Field of Classification Search
CPC ........... G01P 1/006; G01P 3/44; G01C 19/00; G01C 25/00; G06F 3/012; G06F 3/014; G06F 3/0346
See application file for complete search history.

(56) References Cited

U.S. PATENT DOCUMENTS

| 9,534,924 B2 | 1/2017 | Ahuja et al. |
| 2002/0100322 A1 | 8/2002 | Ebara et al. |
| (Continued) | | |

FOREIGN PATENT DOCUMENTS

| CN | 102230806 A | 11/2011 |
| CN | 105387859 A | 3/2016 |
| (Continued) | | |

OTHER PUBLICATIONS

International Search Report dated Dec. 3, 2018 in connection with International Patent Application No. PCT/KR2018/008761, 4 pages.
(Continued)

*Primary Examiner* — Bryan Bui

(57) ABSTRACT

A method for compensating for gyroscope drift on an electronic device includes receiving by a data processing unit, measurement data from a gyroscope. The method includes computing, by the data processing unit, a compensation parameter by analyzing the measurement data received from the gyroscope with respect to variations in temperature of the gyroscope. The method includes compensating, by the data processing unit, the measurement data by correcting the measurement data with the computed compensation parameter. The compensation parameter is continuously validated to correct the measurement data with the compensation parameter. Further, the received measurement data is updated continuously based on the computed
(Continued)

compensation parameter, independent of the gyroscope on the electronic device, thereby facilitating adaptive drift compensation.

18 Claims, 17 Drawing Sheets

(51) Int. Cl.
    *G06F 3/0346*     (2013.01)
    *G06F 3/01*     (2006.01)
    *G01P 3/44*     (2006.01)
    *G01C 25/00*     (2006.01)
    *G01P 21/00*     (2006.01)

(52) U.S. Cl.
    CPC .............. *G06F 3/012* (2013.01); *G06F 3/014* (2013.01); *G06F 3/0346* (2013.01); *G01P 21/00* (2013.01)

(56) References Cited

U.S. PATENT DOCUMENTS

| | | | |
|---|---|---|---|
| 2003/0036847 A1* | 2/2003 | Geier | G01C 21/165 701/472 |
| 2003/0036874 A1 | 2/2003 | Fuller, III et al. | |
| 2005/0071118 A1 | 3/2005 | Usuda et al. | |
| 2009/0326851 A1 | 12/2009 | Tanenhaus | |
| 2011/0246117 A1 | 10/2011 | Moore et al. | |
| 2012/0203488 A1 | 8/2012 | Dusha | |
| 2015/0276783 A1* | 10/2015 | Palella | G01C 19/5712 702/141 |
| 2015/0285835 A1 | 10/2015 | Karahan et al. | |
| 2016/0252366 A1 | 9/2016 | Park et al. | |

FOREIGN PATENT DOCUMENTS

| | | | |
|---|---|---|---|
| CN | 106500728 A | 3/2017 | |
| EP | 1221586 A2 | 7/2002 | |

OTHER PUBLICATIONS

Supplementary European Search Report in connection with European Application No. 18841341.3 dated Jul. 10, 2020, 8 pages.

Examination report in connection with Indian Application No. 201641026376 dated Jul. 8, 2020, 5 pages.

* cited by examiner

METHOD FOR COMPENSATING GYROSCOPE DRIFT ON AN ELECTRONIC DEVICE

CROSS-REFERENCE TO RELATED APPLICATION AND CLAIM OF PRIORITY

This application is based on and claims priority under 35 U.S.C. § 119(a) to Indian Patent Application No. 201641026376 filed on Aug. 2, 2017, in the Indian Patent Office, the disclosure of which is incorporated by reference herein in its entirety.

BACKGROUND

1. Field

The embodiments herein generally relate to drift compensation. More particularly relates to a method for compensating gyroscope drift on an electronic device.

2. Description of Related Art

Accelerometers and gyroscopes are widely used for a variety of motion sensing applications ranging from inertial navigation to vibration monitoring. The accelerometers measure changes in acceleration (linear) while gyroscopes provide information about angular motion (rotation). These sensors use the inertial properties of light or matter for their operation and are broadly classified as 'inertial sensors'.

The inertial sensors find wide applications due to the increased capability of electronic devices, new areas of interactive mobile usage, emergence of Head Mounted Display (HMD) and other wearable devices. The inertial sensors are used in 3D gaming platforms and Virtual Reality (VR) applications to track user movements and update the view, game control and scenarios.

The inertial sensors have errors due to mechanical structure (i.e., misalignment errors, orthogonality error in sensor axis, sensitivity error, etc.) and external factors (Temperature, Magnetic field, etc.) which causes motion sensors to provide erroneous values leading to poor performance in most of the multimedia applications, also resulting in poor user experience. Occurrence of sensor errors varies from device to device, based on offset variations calculated in most sensors.

For example, the accelerometer is affected by misalignment problem, in case of gyroscope the motion artifacts and variations in temperature causes the gyroscope values to drift. All these errors contribute to poor movement tracking resulting in malfunctioning or abnormal behavior in various applications such as for e.g., Gaming applications, a camera application or the like.

Some methods use gyroscope drift compensation complimentary filters in various systems e.g. an inverted pendulum system to remove gyroscope drift using a tilt sensor, which does not take temperature interference into consideration. Further, there are methods employ a complimentary filter with an inclinometer without Kalman filters to reduce complexity and less computation, but they can lag in accuracy for noise in MEMS, as dynamic parameters in MEMS are not covered by complementary filters. Further, some methods include removing gyro drift using time series data modeling, but these methods may require larger converging time.

Providing a mechanism by which automatic adaptive inertial sensor error correction can be made for enhancing user experience in various scenarios remains a source of technical challenges.

The above information is presented as background information only to help the reader to understand the present disclosure. Applicants have made no determination and make no assertion as to whether any of the above might be applicable as prior art with regard to the present application.

SUMMARY

Certain embodiments according to this disclosure provide a method for compensating gyroscope drift on an electronic device.

Some embodiments according to this disclosure provide a method for compensating the gyroscope drift to enhance user experience in gaming applications, virtual reality (VR) applications and camera applications.

Various embodiments according to this disclosure provide a method for compensating static drift, dynamic drift and temperature drift of the gyroscope.

Certain embodiments according to this disclosure provide a method for compensating the combined drift (i.e., static drift and the dynamic drift) of the gyroscope.

Some embodiments according to this disclosure provide a method to mitigate drifting of values of gyroscope caused by the motion artifacts and variations in temperature, by using temperature variations modeling and static drift filtering of the data.

Various embodiments herein provide a method for compensating gyroscope drift on an electronic device. The method includes receiving by a data processing unit a measurement data from a gyroscope. The method includes computing by the data processing unit a compensation parameter by analyzing the measurement data received from the gyroscope with respect to variations in temperature of the gyroscope. The method includes compensating by the data processing unit the measurement data by correcting the measurement data with the computed compensation parameter.

In certain embodiments, the compensation parameter is one or more of a static drift, a dynamic drift and temperature drift.

In certain embodiments, the variation in temperature of the gyroscope is received from a temperature sensor in the gyroscope.

In various embodiments, the static drift is computed when the electronic device is static, wherein the measurement data received from the gyroscope is compensated with the static drift In certain embodiments, the dynamic drift is computed when the electronic device is in motion, wherein the measurement data received from the gyroscope is corrected by compensating with the dynamic drift.

In various embodiments, the variation in temperature of the gyroscope is analyzed to correct the measurement data by compensating with the temperature drift.

In certain embodiments, the method includes continuously receiving the measurement data and variations in the temperature of the gyroscope. Further, the method includes dynamically updating the received measurement data based on the computed compensation parameter.

Accordingly, certain embodiments according to this disclosure provide an electronic device for compensating gyroscope drift. The electronic device includes a data processing unit configured to receive measurement data from a gyroscope. Further, the data processing unit is configured to compute a compensation parameter by analyzing the measurement data received from the gyroscope with respect to variations in temperature of the gyroscope. Furthermore, the data processing unit is configured to compensate the measurement data by correcting the measurement data with the computed compensation parameter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
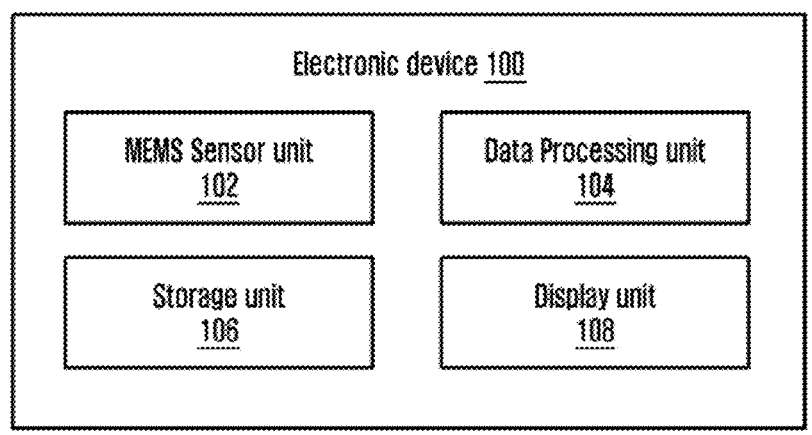
FIG. 1 illustrates hardware elements of an electronic device for gyroscope drift compensation, according to various embodiments of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provide a method for compensating gyroscope drift on an electronic device. The method includes receiving by a data processing unit measurement data from a gyroscope. The method includes computing by the data processing unit, a compensation parameter by analyzing the measurement data received from the gyroscope with respect to variations in temperature of the gyroscope. The variation in temperature of the gyroscope is received from a temperature sensor in the gyroscope, or from a thermistor or from any other temperature sensor. The method includes compensating by the data processing unit, the measurement data by correcting the measurement data with the computed compensation parameter.

Without compensation, Micro-Electro-Mechanical Systems (MEMS) sensors, such as accelerometer and gyroscope sensors in electronic devices, can provide very low quality measurements. Therefore, for initialization and calibration, external systems such as magnetometer and GPS may be required continuously. Drift characteristics of gyroscopes can be difficult to model, which results in severe degradation of orientation information (roll, pitch and yaw). Further, it should be noted that each sensor has different physical properties and environment requirement for proper functioning. If operating conditions or sensor parameters go beyond the specifications, this can lead to different types of errors in each sensor.

Certain embodiments according to this disclosure provide a method which can be used for compensating the gyroscope on the electronic device. In certain embodiments of this method, static drift, dynamic drift and temperature drift of the gyroscope are computed. Further, the measurement data of the gyroscope is corrected by compensating the measurement data with the static drift, the dynamic drift and the temperature drift.

In some embodiments, measurement data from the gyroscope and temperature value of the gyroscope (i.e., gyroscope chip temperature) are obtained from the gyroscope chip (or from system on chip (SOC)) to create a regression model for the compensation of drift.

Certain embodiments of a method according to this disclosure can be used to predict a change in the static drift and dynamic drift over temperature changes by considering both the angular velocity and the chip temperature of the gyroscope. The variation in temperature of the gyroscope is received from a temperature sensor in the gyroscope, or from a thermistor or from any other temperature sensor. The static and dynamic drifts are removed using statistical analysis of the measurement data received from the gyroscope. The corrected data or the compensated data is continuously validated over a period of time for improving the compensation. The compensated data is provided to one or more requesting applications which provides a smoother and a better orientation calculation resulting in better user experience.

In various embodiments according to this disclosure, no external systems such as GPS, magnetometer, or the like are required for initialization which decreases the overall system cost. Further, various embodiments according to this disclosure can be used for reducing battery power consumption of the electronic device as no external systems are utilized for calibration of the conventional MEMS sensors.

Further, methods according to certain embodiments of this disclosure can be used in various image/video capturing applications. For example, an image capturing application can create a 3D image of an object by capturing the images in a 360 degree fashion and stitching thereon. The stitched images can thus be visualized via changing the orientation of a mobile phone or touch options. Further, the methods according to some embodiments of this disclosure can be utilized for other image capturing applications such as panorama, wide angle selfie or the like.

Methods according some embodiments of this disclosure can be used for sensor fusion applications. Sensor fusion suffers from jittering effect and slow drift because of the drift present in gyroscope sensor. In certain embodiments, the drift can be removed up to 99% resulting in stable and accurate orientation information. The control over the drift results in achieving more accurate fusion.

Various embodiments according to this disclosure provide accurate frame selection for stitching which can enhance the overall experience. The accuracy is improved while picking objects in virtual reality (VR).

Attention is directed to the non-limiting examples provided by drawings and more particularly to FIGS. 1 through 9 where similar reference characters denote corresponding features consistently throughout the figures.

The non-limiting example of FIG. 1 illustrates various hardware elements of an electronic device 100 for gyroscope drift compensation, according to various embodiments of the present disclosure. In certain embodiments, the electronic device 100 includes a sensor unit 102, a data processing unit 104, a storage unit 106 and a display unit 108. For example, the electronic device 100 can include a mobile communication device (e.g., smartphone), a computer device, a mobile multimedia device, a mobile medical device, a camera, a wearable device, an HUD, or a household appliance. The electronic devices in embodiments of the present disclosure are not limited to the devices in FIG. 1.

In various embodiments, the sensor unit 102 includes one or more MEMS (micro electro mechanical systems) sensors. For example, the MEMS sensors include an accelerometer, a gyroscope, or any other inertial sensor. However, the embodiments described herein facilitate the compensation of gyroscope drift. In addition, the electronic device 100 may further include various types of sensors, such as a gesture sensor, a pressure sensor, a magnetic sensor, a grip sensor, a proximity sensor, a color sensor, an IR (infrared) sensor, a biometric sensor, a temperature sensor, a humidity sensor, or an illuminance sensor. Each sensor of the sensor unit 102 can be mounted on a separate chip and a plurality of sensors can be mounted on a single chip.

The data processing unit 104 may include one or more processors (for example, an application processor). The data processing unit 104 can be configured to receive a measurement data from the sensor unit 102. In certain embodiments, the measurement data include, for e.g., an angular velocity or rotation of the electronic device 100 along three axes namely x, y, and z as measured by the gyroscope.

In certain embodiments, the measurement data is received for T seconds, where T seconds is the bias time derived using an Allan variance analysis on the data performed only once for the electronic device 100 during boot-up. The measurement data is received when the electronic device 100 is static. In order to ensure whether the electronic device 100 is static or not, the variance of the vector sum over a period of time is determined. The measurement data is stored (in different batches) with temperature. The variation in temperature of the gyroscope is received from a temperature sensor in the gyroscope, or from a thermistor or from any other temperature sensor. The measurement data may be stored transitory or non-transitory in the storage unit 106 or any other memory of the electronic device 100.

According to certain embodiments, data processing unit 104 is configured to correct the measurement data received from the gyroscope. The data processing unit 104 is configured to compute the compensation parameters such as static drift, dynamic drift, and temperature drift. Further, the data processing unit 104 is configured to compensate the measurement data by correcting the measurement data with the computed compensation parameters.

The data processing unit 104 can include various self-learning schemes to determine the compensation parameters. Further, various operations performed by the data processing unit 104 are described in detail in conjunction with reference to FIG. 2.

In the non-limiting example of FIG. 1, storage unit 106 can be configured to store the measurement data obtained from gyroscope and the computed compensation parameters. The storage unit 106 may include one or more computer-readable storage media. The storage unit 106 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 106 may, in some examples, be considered a non-transitory storage medium. The term "non-transitory" may indicate that the storage medium is not embodied in a carrier wave or a propagated signal. However, the term "non-transitory" should not be interpreted that the storage unit 106 is non-movable. In some examples, the storage unit 106 can be configured to store larger amounts of information than the memory. In certain examples, a non-transitory storage medium may store data that can, over time, change (e.g., in Random Access Memory (RAM) or cache).

The display unit 108 can provide information to the outside (e.g., to a user) visually. In certain embodiments, the display unit 108 can be configured to display one or more sensor based applications after correcting the measurement data received from the gyroscope. The one or more applications may include image processing applications, navigation applications, motion sensing applications or the like.

FIG. 1 shows an example of an electronic device 100, according to various embodiments of this disclosure. It is to be understood that other embodiments are not limited thereto. The labels or names of the units are used only for illustrative purpose and does not limit the scope of the disclosure. Further, the electronic device 100 can include any number of units or sub-units communicating among each other along with the other components. Likewise, the functionalities of each unit can be combined by a single unit or can be distributed among each other in a manner different than described herein without departing from the scope of the present disclosure.

Figure 2:
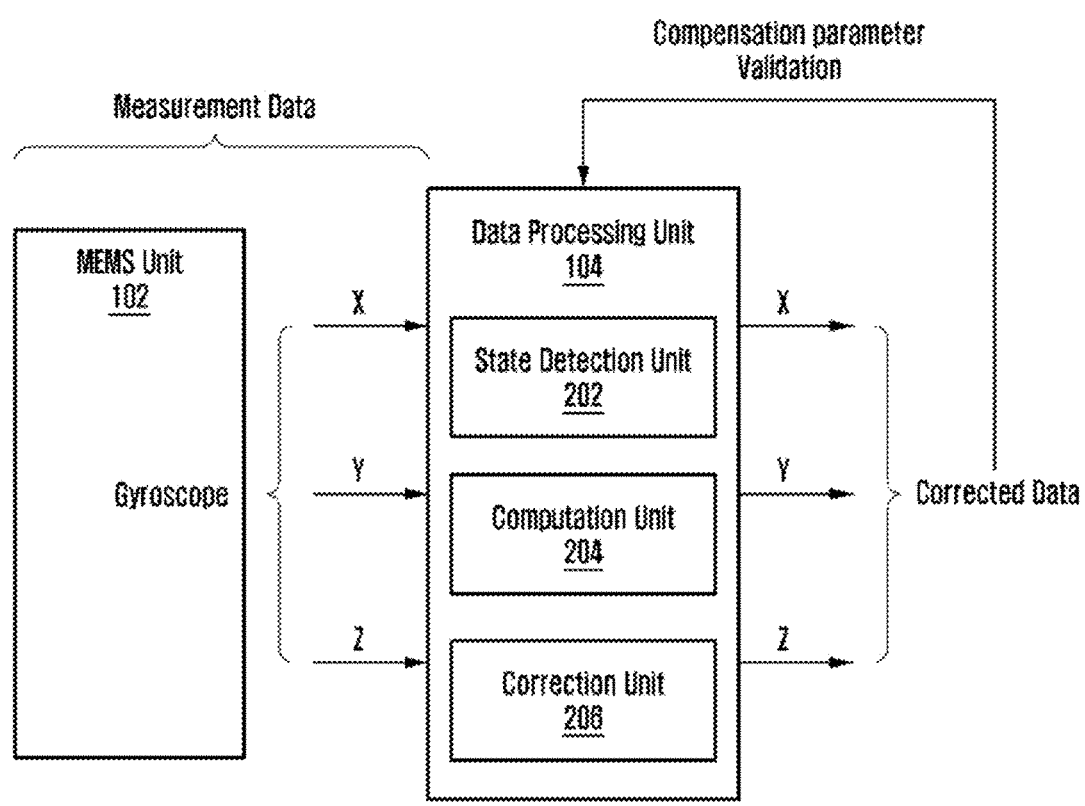
FIG. 2 illustrates hardware elements of a data processing unit of the electronic device, according to certain embodiments of the present disclosure.

FIG. 2 illustrates various hardware elements of the data processing unit 104 of the electronic device 100, according to various embodiments as disclosed herein. In certain embodiments, the data processing unit 104 includes a state detection unit 202, a computation unit 204 and a correction unit 206. The data processing unit may receive a measurement data from the sensor unit 102 (e.g., a gyroscope or other MEMS sensor(s)). In various embodiments, the measurement data may include an angular velocity or rotation of the electronic device 100 along three axes, namely x, y, and z, as measured by the sensor unit 102.

In certain embodiments, the state detection unit 202 can be configured to detect the state of the electronic device 100. The state detection unit 202 can be configured to detect whether the electronic device 100 is static or in motion based on the measurement data or using another sensor.

In various embodiments, the computation unit 204 can be configured to compute the compensation parameters. The compensation parameters include the static drift, dynamic drift and the temperature drift. The three axes gyroscope sensor present in the electronic device 100 measures the angular velocity experienced by the electronic device 100. The gyroscope is affected by various drifts or errors due to semi-conductor properties and thermal effect. The computation unit 204 can calculate the compensation parameter for the data of each of the three axes (X, Y, Z).

In certain embodiments, the correction unit 206 can be configured to correct the measurement data by compensating with the compensation parameters. The correction unit 206 can compensate the measurement data by applying the compensation parameter for the measurement data of each of the three axes (X, Y, Z).

The corrected values of gyroscope data sensor are as represented below.

$$G_{Corr} = G_{real} - S_{drift} - t_{drift} - M_{drift} - \in$$

where $G_{real}$ is measurement data (gyro sensor value), $S_{drift}$ is static drift, $t_{drift}$ due to temperature drift, $M_{drift}$ error during motion and $\in$ is white noise.

In the non-limiting example of FIG. 2, the corrected data or the compensated data is continuously validated over a period of time for improving the compensation. The compensated data is then provided to requesting application for a smoother and better orientation calculation resulting in better user experience.

FIG. 2 shows illustrates of the data processing unit 104 and, it is to be understood that other embodiments are not limited thereto. The labels or names of the components are used only for illustrative purposes and do not limit the scope of the present disclosure. Further, the data processing unit 104 can include any number of units or sub-units communicating among each other along with the other components.

Likewise, the functionalities of each unit can be combined by a single unit or can be distributed among each other in a manner different than described herein without departing from the scope of the disclosure.

Figure 3:
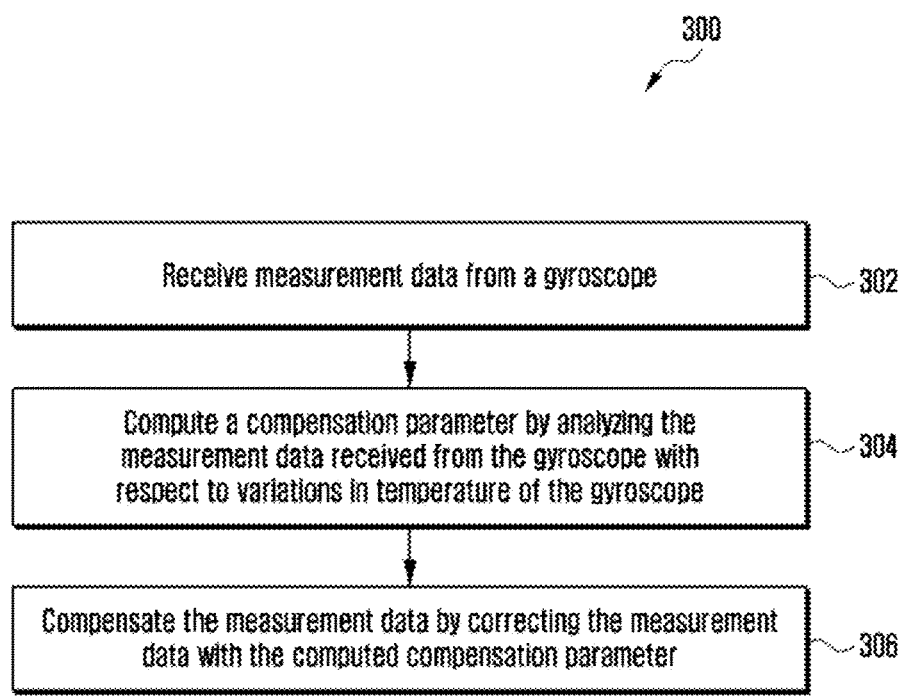
FIG. 3 illustrates operations of a method for gyroscope drift compensation in an electronic device according to various embodiments of the present disclosure.

FIG. 3 illustrates operations of a method 300 for gyroscope drift compensation on the electronic device 100, according to various embodiments as disclosed herein. In certain embodiments, at step 302, the method includes receiving the measurement data from the gyroscope. The method allows the data processing unit 104 to receive the measurement data from the gyroscope (or sensor unit 102). The measurement data includes values of the angular velocity of the electronic device 100 obtained from the gyroscope. At step 304, the method includes computing the compensation parameters. The method allows the data processing unit 104 to compute the compensation parameter. The compensation parameter includes the static drift, the dynamic drift and the temperature drift.

In the non-limiting example of FIG. 3, the compensation parameter includes a combination of static drift and the dynamic drift. Each compensation parameter is computed independently for correcting the measurement data. The various steps involved in computing each compensation parameter is explained in conjunction with FIG. 4.

In certain embodiments, at step 306, the method includes compensating the measurement data by correcting the measurement data with the computed compensation parameters. The method allows the data processing unit 104 to compensate the measurement data by correcting the measurement data with the computed compensation parameters. The measurement data is corrected with the computed compensation parameters.

In various embodiments according to this disclosure, the compensated data and temperature value are monitored continuously. A determination is made for identifying new incoming temperature and associated angular velocity, the regression model is updated, enhancing the compensation parameter, thus adaptive learning (On device learning) is performed by the electronic device 100. The drift in the compensated data is calculated and updated to remove the error. The data processing unit 104 can determine the compensation parameter by using a statistical model. For example, the data processing unit 104 can store the compensation parameter that corresponds to the state (e.g., stopping, angular speed, temperature) of the electronic device 100 and can update the stored compensation parameter.

In certain embodiments, the data processing unit 104 is configured to validate the compensation parameter continuously to correct the measurement data with the compensation parameter. The compensation parameter is enhanced by validating the compensation parameter continuously. Further, the received measurement data is continuously updated based on the computed compensation parameter, independent of the gyroscope on the electronic device 100. Some embodiments according to this disclosure calculate the drift in the compensated data and update the measurement data to remove error. In some embodiments, the method can be utilized, independent of the gyroscope on the electronic device 100, thus the proposed method is self-adaptive (i.e., On device learning) to correct the gyroscope drift.

The various actions, acts, blocks, steps, or the like shown in the non-limiting example of FIG. 3 may be performed in the order presented, in a different order or simultaneously. Further, in some embodiments, some of the actions, acts, blocks, steps, or the like may be omitted, added, modified, skipped, or the like without departing from the scope of the present disclosure.

Figure 4:
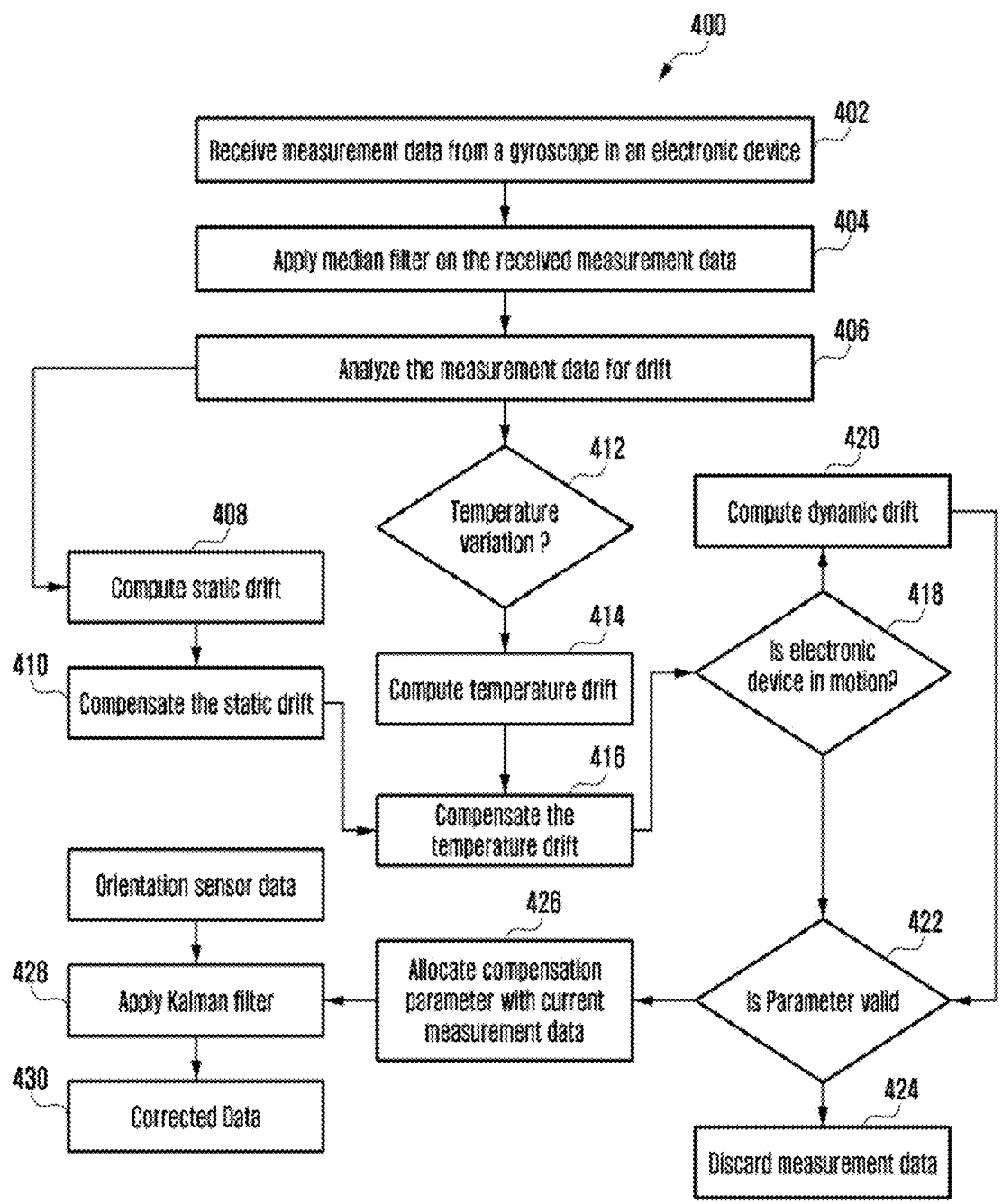
FIG. 4 illustrates operations of a method for computing one or more compensation parameters to compensate the gyroscope drift, according to certain embodiments of the present disclosure.

FIG. 4 illustrates operations of a method 400 for computing one or more compensation parameters to compensate the gyroscope drift, according to various embodiments of the present disclosure. In certain embodiments, at step 402, the method includes receiving the measurement data from the gyroscope on the electronic device 100. According to certain embodiments, the data processing unit 104 receives the measurement data from the gyroscope. The measurement data includes angular motion of the electronic device and temperature value from the gyroscope chip. The measurement data from the gyroscope contains random noise. In order to remove the random noise, at step 404, the method includes applying median filter on the received measurement data. For example, a median filter of window size 7 is used to filter the random noise. The filtered data is processed for computing the compensation parameters. The filtered data is captured for T seconds, where T seconds is a drift time derived using the Allan variance analysis on the measurement data performed only once for the electronic device 100 during boot. The gyroscope data is captured when the electronic device 100 is static. To ensure whether the electronic device 100 is static or not, the variance of the vector sum over a period of time is determined.

After receiving the measurement, the measurement data is stored in different batches with temperature. The captured data median is calculated and considered as the combined offsets for temperature and the static drift till the temperature model described below obtains sufficient values.

At step 406, the measurement data received from the gyroscope is analyzed with respect to variations in the temperature. In this non-limiting example, the data processing unit 104 analyzes the measurement data received from the gyroscope with respect to variations in the temperature. The gyroscope chips may be equipped with a dedicated temperature sensor for measuring the temperature of the sensor. The working temperature range of the temperature sensor is approximately 15° C. to 70° C. (not limited to). The data processing unit 104 is configured to analyze the measurement data variation with the temperature for each axis (X, Y, and Z). As the variation of temperature and the static drift is not very sudden and, the data processing unit 104 utilizes a linear regression model on the measurement data received for various range of temperatures. Although a linear regression model is utilized here, it should be noted that any higher order regression model may be used. In order create accurate model for the temperature variation, the measurement data from the gyroscope is obtained for at least five different temperature values. The model is updated once sufficient value for the new temperature is added which further enhances the accuracy.

In some embodiments, at step 408, the method includes computing the static drift and at step 410, the method includes compensating for the static drift. In certain embodiments, the data processing unit 104 computes the static drift and compensates for the static drift. The static drift is computed using the below mentioned equations (1) and (2).

$$m = \frac{\sum_{k=1}^{n}(T_k - \overline{T})*(G_k{}')}{\sum_{k=1}^{n}(T_k - \overline{T})^2} \quad (1)$$

$$C = \overline{G} - (\overline{T}*m) \quad (2)$$

Where m is slope of the line, C is the intercept of the fitted line, G is gyro value mean and T is the temperature mean.

From the equations (1) and (2), the static drift for a particular temperature is described in the equation (3)

$$\text{drift} = m*T + C \quad (3)$$

In equation (3), the drift calculated from the model contains static drift and temperature drift. 'C' is static drift, i.e., drift at zero degree and m*T is temperature drift. Once the model is completed, the static drift is updated.

According to the non-limiting example of FIG. 4, at step 412, the method includes determining temperature variation. The method allows the data processing unit 104 to determine temperature variation. At step 414, the method includes computing temperature drift and at step 416, the method includes compensating the temperature drift. The method allows the data processing unit 104 to compute and compensate the temperature drift. In certain embodiments, data processing unit 104 computes and compensates the temperature drift only when the temperature variation is detected.

As shown in the non-limiting example of FIG. 4, at step 418, the method includes determining whether the electronic device 100 is in motion. Some gyroscopes present in electronic device 100 can suffer from misalignment errors which results in erroneous performance when the electronic device 100 is in motion. In certain cases, the misalignment error results in wrong distribution of angular velocity in different axes in a tri-axial gyroscope.

At step 420, the method includes computing the dynamic drift when the electronic device 100 is in motion. The data processing unit 104 computes the dynamic drift.

In certain embodiments, at step 422, a determination of whether the computed compensation parameters are valid is performed. In some embodiments, data processing unit 104 determines whether the computed compensation parameters are valid. If the computed compensation parameters are not valid, then at step 424, the compensation parameters are discarded. The drift compensated gyroscope data using computed parameter is integrated to compute the drift present; if the drift is higher than a threshold the parameters are invalidated. The entire validation happens when the static condition is observed by the state detection unit 202.

If the computed compensation parameters are valid, then at step 426, the method includes allocating compensation parameter with current measurement data. The method allows the data processing unit to allocate the compensation parameter with current measurement data.

At step 428, the method includes applying a Kalman filter on the measurement data. The drift compensated signal includes high frequency noise which is removed using the Kalman filter by fusing the orientation data. The Kalman filter is used to compensate the measurement data of the gyroscope with the orientation data of the gyroscope. The state space equation is shown in (4)

$$\theta_{t+\Delta t} = \theta_t + \Delta_t * \dot{\theta} \quad (4)$$

Where $\theta_t$ value is form the orientation data and $\dot{\theta}$ is value from the gyroscope and $\Delta t$ is the constant sampling time. The state transition matrix and observation matrix is shown in (5) and (6) respectively.

$$A = \begin{bmatrix} 1 & \Delta t \\ 0 & 1 \end{bmatrix} \quad (5)$$

$$H = \begin{bmatrix} 1 & ' \\ 0 & 1 \end{bmatrix} \quad (6)$$

The processing noise and the experimental noise is shown in (7) and (8) respectively, $$Q = \begin{bmatrix} 0.00009 & 0 \\ 0 & 0.00009 \end{bmatrix} \quad (7)$$

$$R = \begin{bmatrix} 0.002 & 0 \\ 0 & 0.002 \end{bmatrix} \quad (8)$$

The input matrix for the Kalman filter is shown in (9)

$$X_{input} = \begin{bmatrix} \text{Orientation\_angle} \\ \text{gyroscope\_data} \end{bmatrix} \quad (9)$$

The Kalman filter removes the noise and compensates the orientation error to obtain the corrected data at step 430.

In certain embodiments according to this disclosure, the compensation parameter is enhanced by validating the compensation parameter continuously. Further, the received measurement data is continuously updated based on the computed compensation parameter, independent of the gyroscope on the electronic device 100. The proposed method calculates the drift in the compensated data and updates the measurement data to remove error. The method can be utilized independent of the gyroscope on the electronic device 100, thus the proposed method is self-adaptive (i.e. on device learning) to correct the gyroscope drift.

The various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from the scope of the present disclosure.

Figure 5A:
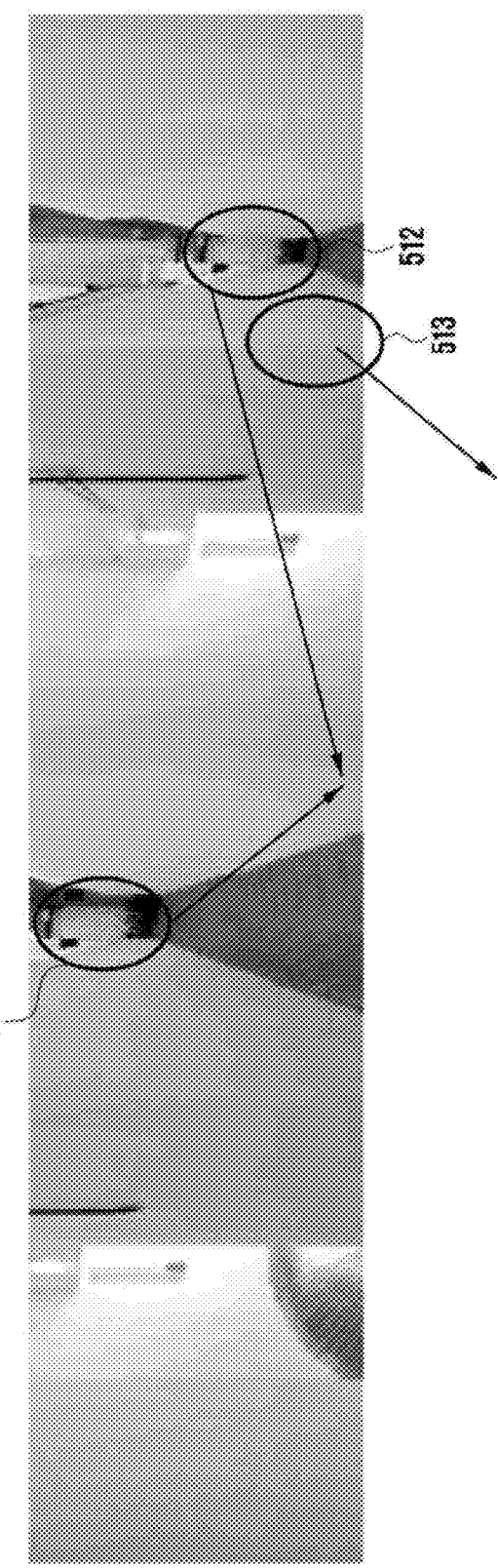
FIGS. 5a and 5b illustrate a comparison of images before gyroscope drift compensation and after gyroscope drift compensation, according to various embodiments of the present disclosure.
Figure 5B:
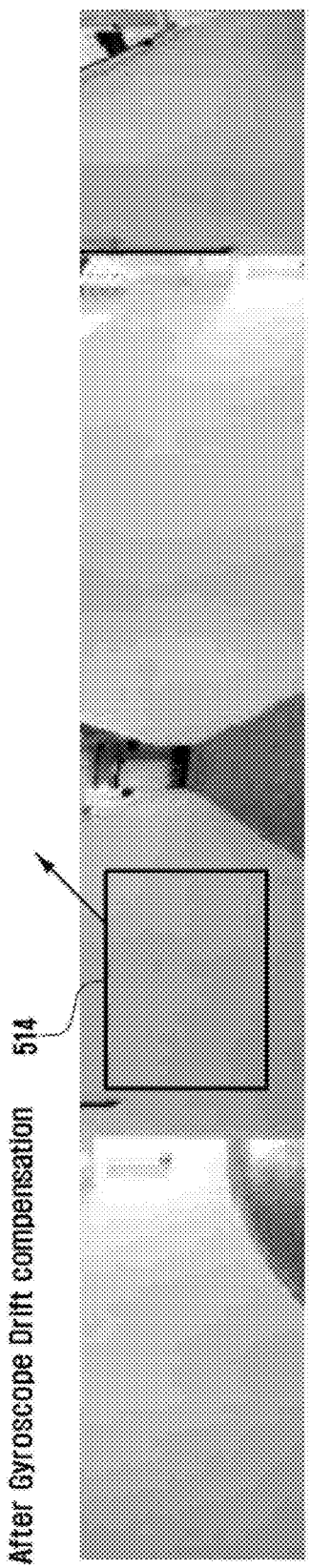

FIGS. 5a and 5b illustrate examples of images before and after applying gyroscope drift compensation, according to various embodiments of the present disclosure. As depicted in FIG. 5a, in 360 degrees motion the electronic device 100 without drift compensation has repetitions because of incorrect orientation information as shown in FIG. 5a. For example, although the electronic device 100 rotate 360 degrees, same objects 511 and 512 are captured twice because of incorrect orientation information. Further, in FIG. 5a, there is an incorrect perception of depth and wall length due to incorrect orientation information of the electronic device 100. With the proposed method, the gyroscope drift is compensated. The drift compensation removes the error in angle calculation. Further, the temperature drift compensates the impact of temperature when the usage of camera causes a raise in temperature of the electronic device 100. Thus, the gyroscope drift compensation provides accurate rotation angle, such that the repetitions are removed as shown in FIG. 5b. For example, a portion of wall 514 in FIG. 5b is more clear than 513 in FIG. 5a. The incorrect perception of the depth and wall length is resolved by compensating the gyroscope drift as shown in FIG. 5b.

Figure 6A:
FIGS. 6a and 6b illustrate a comparison of images captured by the electronic device after gyroscope drift compensation, according to certain embodiments of the present disclosure.
Figure 6B:

FIGS. 6a and 6b illustrate examples of images captured by the electronic device 100 after gyroscope drift compensation, according to certain embodiments of the present disclosure. The incorrect orientation of the electronic device 100 can lead to a lack of width in a wide angle selfie. With the proposed method for gyroscope drift compensation, the angular rotation of the electronic device 100 can be identified accurately. The proposed method can be used to capture wide-angle selfie accurately by the electronic device 100 as shown in the FIGS. 6a and 6b by compensating for the gyroscope drift.

Figure 7A:
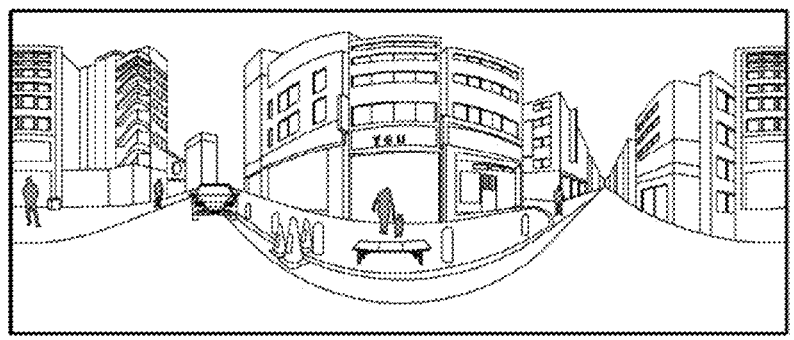
FIGS. 7a and 7b illustrate a comparison of 360° images captured by the electronic device before gyroscope drift compensation and after gyroscope drift compensation, according to various embodiments of the present disclosure.
Figure 7B:
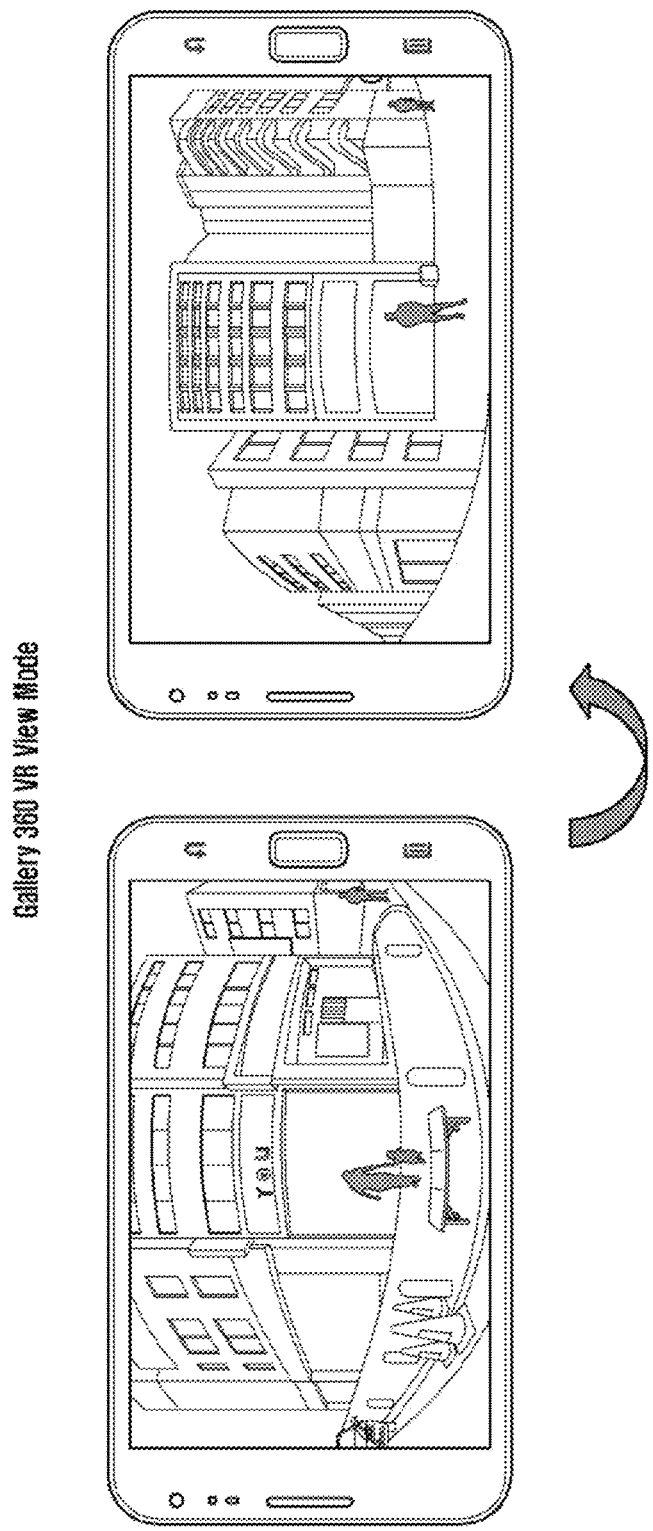

FIGS. 7a and 7b illustrate a comparison of 360° images captured by the electronic device 100 before and after performing gyroscope drift compensation, according to various embodiments of this disclosure. As depicted in FIG. 7a, due to the gyroscope drift, the angular rotation of the electronic device 100 to capture the image is not accurate. After gyroscope drift compensation using the proposed method, the angular orientation of the electronic device 100 while capturing the 360° image is accurate and the motion of the image is smooth.

Figure 8A:
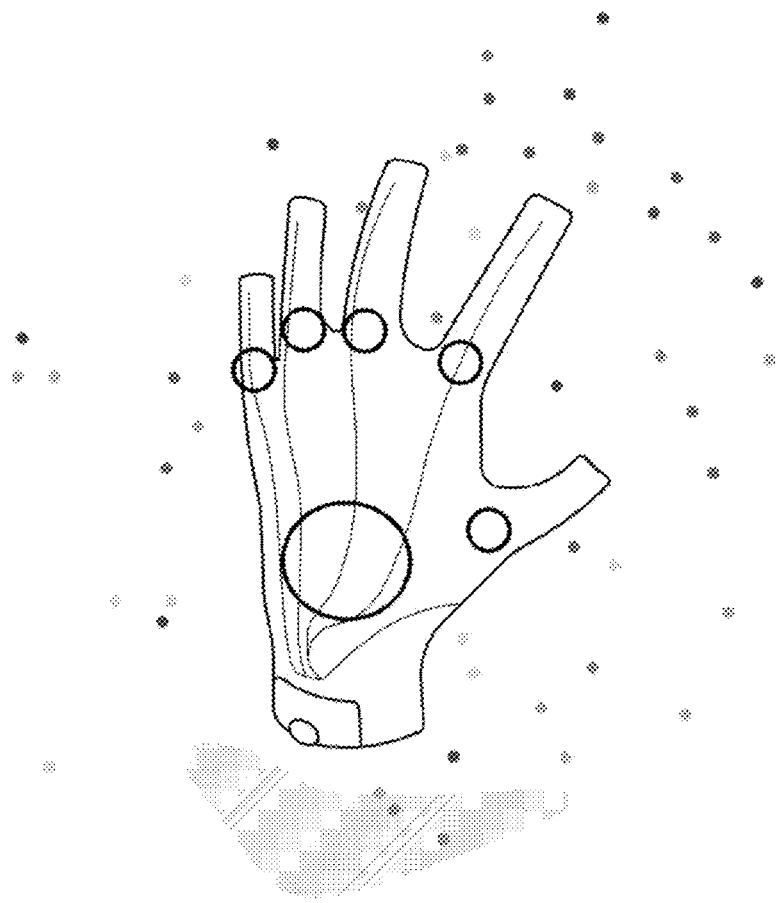
FIGS. 8a and 8b illustrate an example of object picking in virtual reality (VR) using a glove, according to certain embodiments of the present disclosure.
Figure 8B:
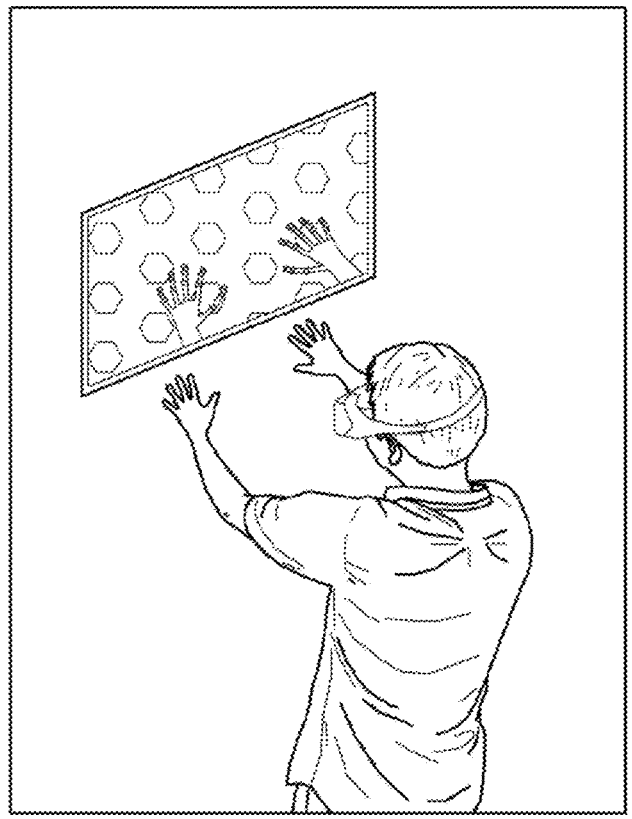

FIGS. 8a and 8b illustrate an example of object picking in virtual reality (VR) using a glove, according to certain embodiments as described herein. As depicted in FIG. 8a, the VR glove contains six gyroscopes to track finger orientation and hand orientation. The VR glove uses IMU to track finger orientation and hand orientation. The corrected gyroscope measurement data helps to track the orientation of each finger joint and the hand itself to create the virtual hand for picking and manipulating objects in a virtual reality/augmented reality environment.

Figure 9A:
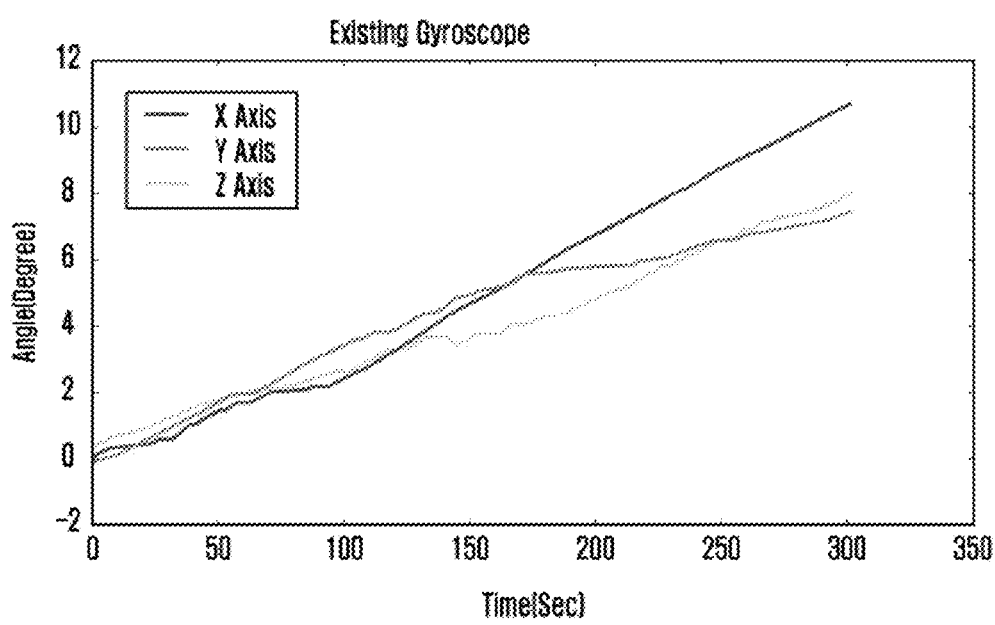
FIGS. 9a and 9b illustrate examples of angular drift of a gyroscope when an electronic device is static.
Figure 9B:
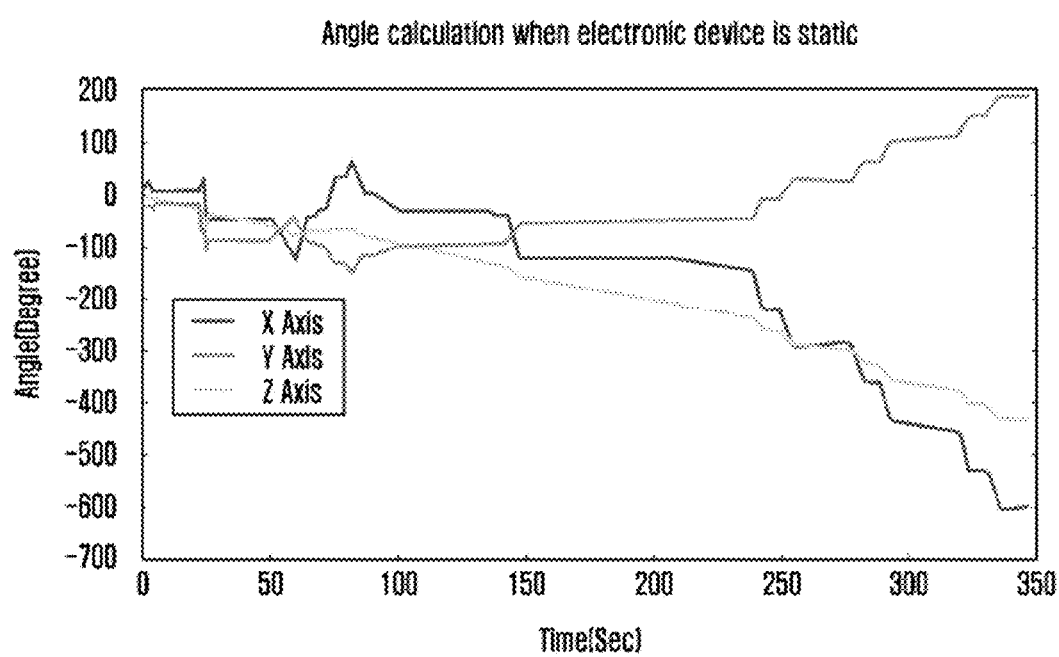

FIGS. 9a and 9b are graphs showing angular drift of the gyroscope when the electronic device 100 is static, according to prior art. As depicted in FIG. 9a, when the electronic device 100 is static, the orientation of the electronic device 100 undergoes drifting. The angle determination when the electronic device is static is shown in FIG. 9b.

Figure 10A:
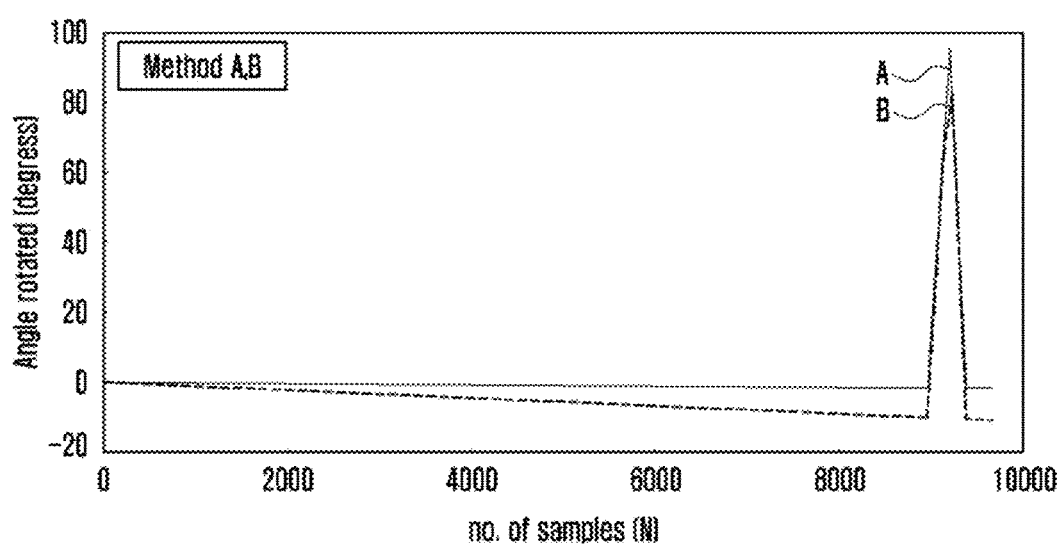
FIGS. 10a and 10b illustrate corrections of angular drift when an electronic device is in motion and in static condition, according to various embodiments of the present disclosure.
Figure 10B:
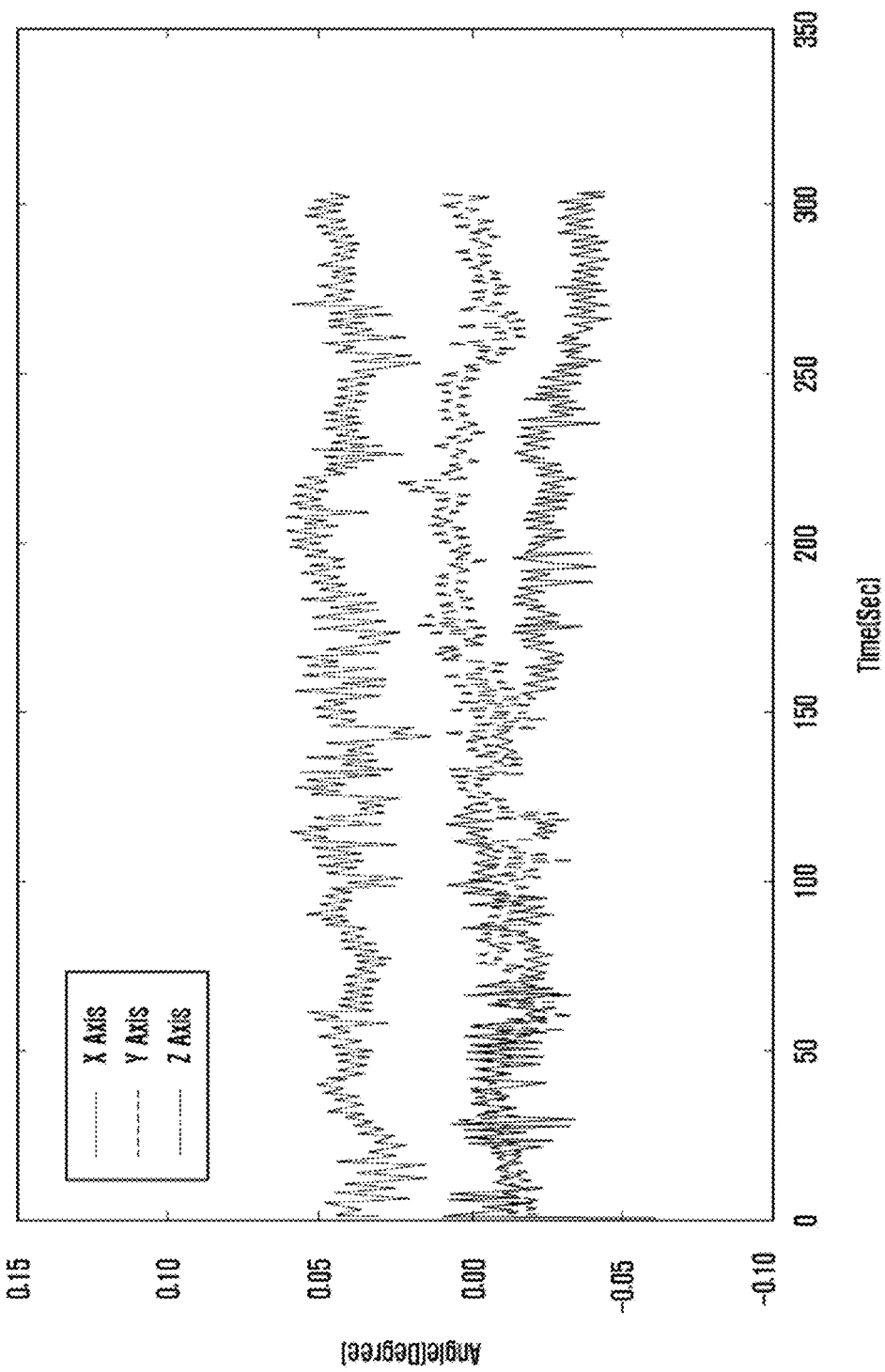

FIGS. 10a and 10b are graphs showing corrected angular drift when the electronic device 100 is in motion and static respectively, according to various embodiments of this disclosure. In the some methods, when the electronic device 100 is in rotated by 90°, the electronic device 100 rotates to 95°, as shown in FIG. 10a. However, with the proposed method, the angular rotation of the electronic device is close to 90° as shown in FIG. 10a.

In certain embodiments, when the electronic device 100 is static, errors removed from the measurement data resulting in zero drift in the angular orientation calculation as show in FIG. 10b.

Figure 11:
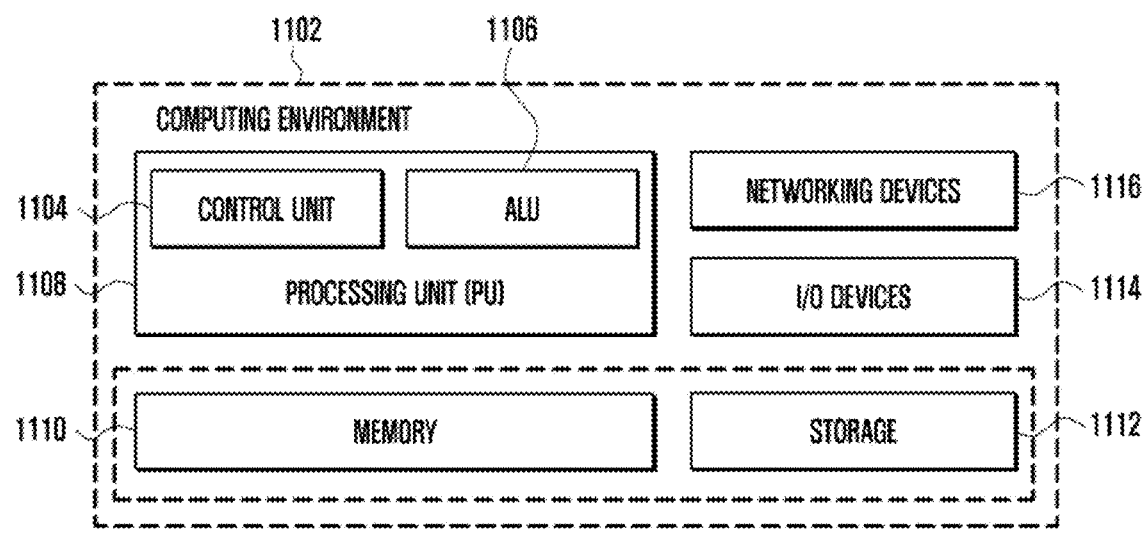
FIG. 11 illustrates, in block diagram format, a computing environment for implementing a method for gyroscope drift compensation, according to certain embodiments of the present disclosure.

FIG. 11 illustrates a computing environment for implementing methods for compensating gyroscope drift, according to certain embodiments disclosed herein. As depicted in the non-limiting example of FIG. 11, the computing environment 1102 comprises at least one processing unit 1108 equipped with a control unit 1104 and an Arithmetic Logic Unit (ALU) 1106, a memory 1110, a storage unit 1112, plurality of networking devices 1116 and a plurality Input output (I/O) devices 1114. The processing unit 1104 is responsible for processing the instructions of the algorithm. The processing unit 1108 receives commands from the control unit in order to perform its processing. Further, any logical and arithmetic operations involved in the execution of the instructions are computed with the help of the ALU 1106.

In certain embodiments, overall computing environment 1102 can be composed of multiple homogeneous and/or heterogeneous cores, multiple CPUs of different kinds, special media and other accelerators. The processing unit 1108 is responsible for processing the instructions of the algorithm. Further, the plurality of processing units 1108 may be located on a single chip or over multiple chips.

The instructions and codes for implementation are stored in either the memory unit 1010 or the storage 1112 or both. At the time of execution, the instructions may be fetched from the corresponding memory 1110 or storage 1112, and executed by the processing unit 1108.

In some embodiments, various networking devices 1116 or external I/O devices 1114 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 11 include blocks which can be at least one of a hardware device, or a combination of hardware device and software module.

It is to be understood that the phraseology or terminology employed herein is for the purpose of description and not of limitation. Therefore, while embodiments herein have been described in terms of illustrative embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for compensating for gyroscope drift on an electronic device, the method comprising:
   acquiring, by a gyroscope sensor, measurement data including at least one of an angular velocity or a rotation of the electronic device;
   computing, by at least one processor, a compensation parameter by analyzing the measurement data with respect to variations in temperature of the gyroscope sensor based on temperature data received from a temperature sensor; and
   compensating, by the at least one processor, the measurement data by correcting the measurement data based on the computed compensation parameter,
   wherein the compensation parameter includes a static drift, a dynamic drift, and a temperature drift,
   wherein the static drift, the dynamic drift, and the temperature drift are calculated independently according to temperature and state of the electronic device, and
   wherein the dynamic drift corresponds to misalignment errors in the gyroscope sensor during motion of the electronic device and computed when the electronic device is in the motion.

2. The method of claim 1, wherein computing the compensation parameter comprises computing the static drift when the electronic device is static, wherein the measurement data received from the gyroscope sensor is corrected by compensating for the static drift.

3. The method of claim 1, wherein computing the compensation parameter comprises computing the dynamic drift when the electronic device is in motion, wherein the measurement data received from the gyroscope sensor is corrected by compensating for the dynamic drift.

4. The method of claim 1, wherein variations in temperature of the gyroscope sensor are analyzed to correct the measurement data by compensating for the temperature drift.

5. The method of claim 1, wherein compensating the measurement data comprises adding or subtracting at least one of the static drift, the dynamic drift, and the temperature drift from the measurement data.

6. The method of claim 1, wherein variations of temperature are received from a temperature sensor in the gyroscope sensor.

7. The method of claim 1, further comprising applying a Kalman filter to the measurement data.

8. The method of claim 1, wherein the method further comprises:
continuously receiving the measurement data and variations in temperature of the gyroscope sensor; and
dynamically updating the received measurement data based on the computed compensation parameter.

9. The method of claim 8, wherein the compensation parameter is continuously validated to correct the measurement data with the compensation parameter.

10. The method of claim 8, wherein the received measurement data is updated continuously based on the computed compensation parameter, independent of the gyroscope sensor on the electronic device.

11. An electronic device for compensating for gyroscope drift, the electronic device comprising:
a gyroscope sensor configured to acquire measurement data including at least one of an angular velocity or a rotation of the electronic device;
at least one processor configured to:
receive the measurement data from the gyroscope sensor;
compute a compensation parameter by analyzing the measurement data with respect to variations in temperature of the gyroscope sensor based on temperature data received from a temperature sensor; and
compensate the measurement data by correcting the measurement data based on the computed compensation parameter,
wherein the compensation parameter includes a static drift, a dynamic drift, and a temperature drift,
wherein the static drift, the dynamic drift, and the temperature drift are calculated independently according to temperature and state of the electronic device, and
wherein the dynamic drift corresponds to misalignment errors in the gyroscope sensor during motion of the electronic device and computed when the electronic device is in the motion.

12. The electronic device of claim 11, wherein the at least one processor is configured to compute the static drift when the electronic device is static, wherein the measurement data received from the gyroscope sensor is corrected by compensating for the static drift.

13. The electronic device of claim 11, wherein the at least one processor is configured to compute the dynamic drift when the electronic device is in motion, wherein the measurement data received from the gyroscope sensor is corrected by compensating for the dynamic drift.

14. The electronic device of claim 11, wherein the at least one processor is configured to analyze variations in temperature of the gyroscope sensor to correct the measurement data by compensating with the temperature drift.

15. The electronic device of claim 11, wherein the at least one processor is configured to receive the variations of temperature from a temperature sensor in the gyroscope sensor.

16. The electronic device of claim 11, wherein the at least one processor is further configured to:
continuously receive measurement data and variations in temperature of the gyroscope sensor; and
dynamically update the received measurement data based on the computed compensation parameter.

17. The electronic device of claim 16, wherein the at least one processor is configured to validate the compensation parameter continuously to correct the measurement data with the compensation parameter.

18. The electronic device of claim 16, wherein the at least one processor is configured to update the received measurement data continuously based on the computed compensation parameter, independent of the gyroscope sensor on the electronic device.

* * * * *